(12) United States Patent
Wollin

(10) Patent No.: US 9,135,790 B2
(45) Date of Patent: Sep. 15, 2015

(54) HANDHELD DEVICE AND METHOD FOR DETERMINING THE LOCATION OF PHYSICAL OBJECTS STORED IN STORAGE CONTAINERS

(71) Applicant: Moshe Cohen Wollin, Tel Aviv (IL)

(72) Inventor: Moshe Cohen Wollin, Tel Aviv (IL)

(73) Assignee: Rotho Kunststoff AG (CH)

( * ) Notice: Subject to any disclaimer, the term of this patent is extended or adjusted under 35 U.S.C. 154(b) by 177 days.

(21) Appl. No.: 13/756,776

(22) Filed: Feb. 1, 2013

(65) Prior Publication Data

US 2013/0201002 A1 Aug. 8, 2013

(30) Foreign Application Priority Data

Feb. 2, 2012 (EP) .................................... 12153622

(51) Int. Cl.
  *G08B 5/36* (2006.01)
  *G08B 13/14* (2006.01)
  *G06F 19/00* (2011.01)
  *G06Q 10/08* (2012.01)

(52) U.S. Cl.
  CPC . *G08B 5/36* (2013.01); *G06Q 10/08* (2013.01)

(58) Field of Classification Search
  CPC ........................................................ G08B 5/36
  USPC ............. 340/8.1, 568.1, 568.2, 570; 235/383, 235/385, 472.01; 705/3, 2; 700/215
  See application file for complete search history.

(56) References Cited

U.S. PATENT DOCUMENTS

| | | | |
|---|---|---|---|
| 5,312,011 A | 5/1994 | Fischer | |
| 5,565,858 A * | 10/1996 | Guthrie | 340/10.33 |
| 5,689,238 A * | 11/1997 | Cannon et al. | 340/572.1 |
| 5,900,610 A * | 5/1999 | Kelly, Jr. | 235/385 |
| 6,707,381 B1 * | 3/2004 | Maloney | 340/568.1 |
| 7,066,388 B2 * | 6/2006 | He | 235/383 |
| 7,236,936 B2 * | 6/2007 | White et al. | 705/3 |
| 7,267,271 B2 * | 9/2007 | Rhea | 235/385 |
| 7,287,694 B2 * | 10/2007 | Banavar et al. | 235/383 |

FOREIGN PATENT DOCUMENTS

FR  2 717 593 A1  9/1995
JP  2007-246125   9/2007

OTHER PUBLICATIONS

Wikipedia, the free encyclopedia, "Barcode" Retrieved from "http://en.wikipedia.org/wiki/barcode" (Version Jan. 31, 2012).

(Continued)

*Primary Examiner* — Nam V Nguyen
(74) *Attorney, Agent, or Firm* — Ostrolenk Faber LLP

(57) ABSTRACT

The invention relates to a handheld device (1) for determining the location of a physical object (21) stored in a storage container (31). A reader system reads on the storage container (31) a visual code (31.1) which comprises a unique container identifier (31.2). A data entry system is configured to store object data (21.2) identifying the physical object (21) in a data store (1.4) linked to the container identifier (31.2). The data entry system is further configured to capture query data which defines the physical object (21). A query module is configured to determine the container identifier (31.2) by comparing the query data to the object data (21.2) in the data store (1.4), and to indicate the location of the physical object (21) by showing on a display the container identifier (31.2) of the storage container (31) containing the physical object (21).

15 Claims, 3 Drawing Sheets

(56) References Cited

OTHER PUBLICATIONS

Wikipedia, the free encyclopedia, "QR code" Retrieved from "http://en.wikipedia.org/wiki/Qr_code" (Version Jan. 28, 2012).

Wikipedia, the free encyclopedia, "MSI Barcode" Retrieved from "http://en.wikipedia.org/wiki/MSI_Barcode" (Version Dec. 27, 2011).

Wikipedia, the free encyclopedia, "Packaging and Labeling" Retrieved from "http://en.wikipedia.org/wiki/Packaging_and_labeling" (Version Dec. 14, 2011).

Wikipedia, the free encyclopedia, "Automatic Identification and Data Capture" Retrieved from "http://en.wikipedia.org/wiki/Automatic_identification_and_data_capture" (Version Jan. 10, 2012).

Wikipedia, the free encyclopedia, "Object Hyperlinking" Retrieved from "http://en.wikipedia.org/wiki/Object_hyperlinking" (Version Nov. 24, 2011).

* cited by examiner

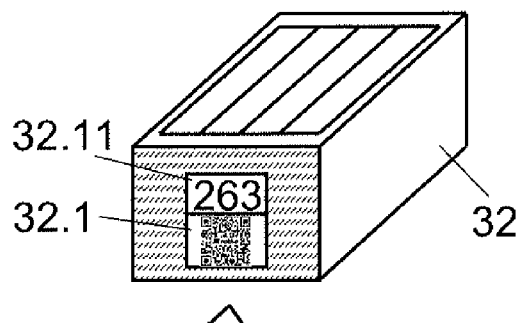
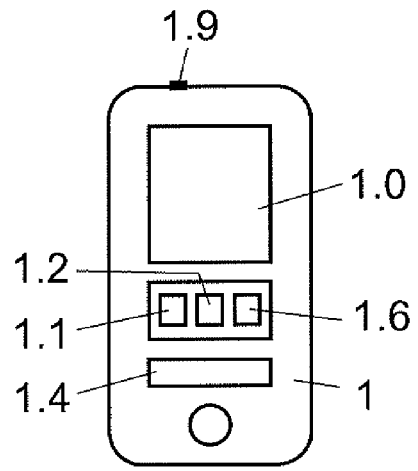
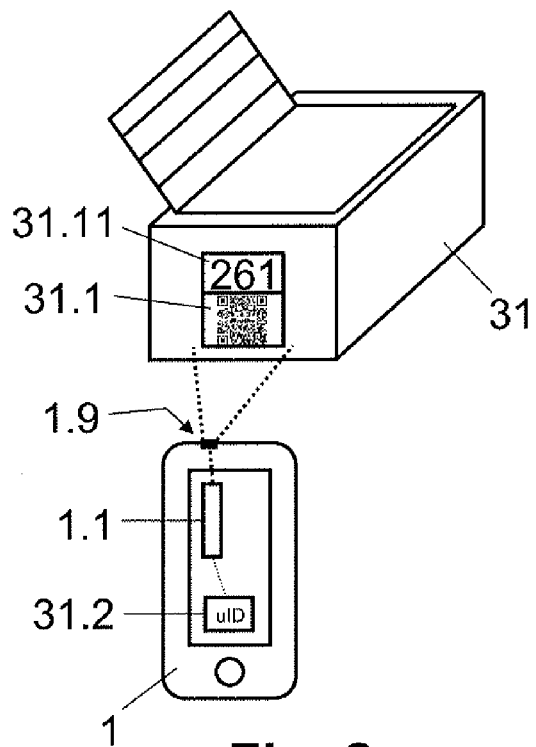
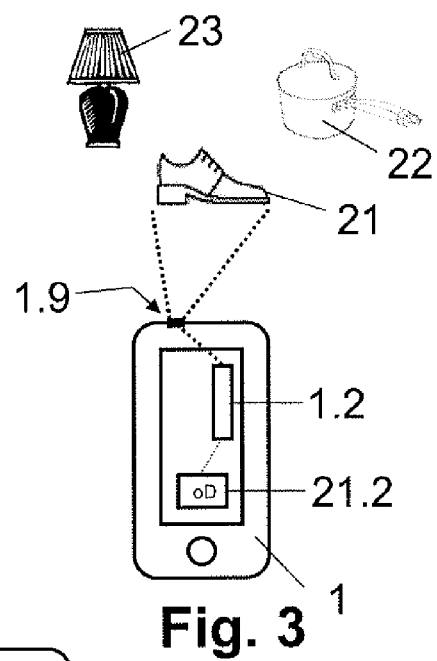
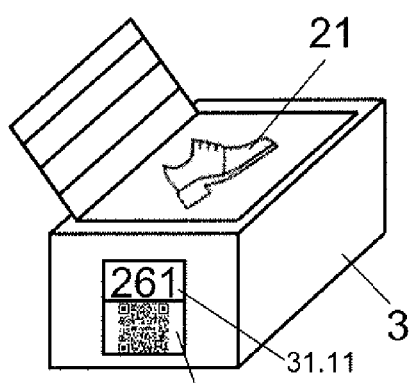
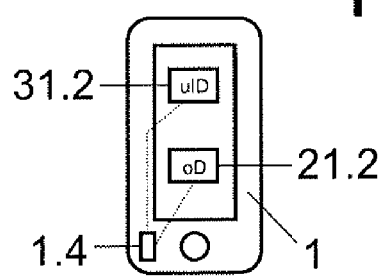
Fig. 1
Fig. 2
Fig. 3
Fig. 4

HANDHELD DEVICE AND METHOD FOR DETERMINING THE LOCATION OF PHYSICAL OBJECTS STORED IN STORAGE CONTAINERS

FIELD OF THE INVENTION

The present invention relates to a handheld device and a method for determining the location of a physical object which is stored in one of a plurality of storage containers.

BACKGROUND OF THE INVENTION

In households as well as in small and large enterprises, physical objects, for example clothes, household articles, articles for the kitchen, etc., which are currently not needed are stored in storage containers. The storage containers are then further stored in an attic, a cellar or any other storage room. When a user needs a certain physical object, for example a certain pan which is only used rarely for some specific recipe, the user accesses and browses through the storage containers, hopefully finding the desired is physical object in a reasonable time.

For identifying the contents of a container, FR 2717593 discloses a label which is composed of a memory and a transceiver and includes a visual graphic in clear or coded form.

U.S. Pat. No. 5,312,011 discloses a stackable container system with a plurality of individual containers. The containers comprise at least a part formed of transparent material for the visual inspection of the contents. The containers may be individually color coded for easier identification.

JP 2007246125 discloses a container with a two-dimensional code. A QR (Quick Response) code is printed on the front face of the container. The QR code is reversed and covered, such that the QR code is unreadable when the container contains the content article, and becomes readable when the container is empty. Information unnecessary for a purchaser such as container recovery information is kept unnoticeable before the purchase of the container.

SUMMARY OF THE INVENTION

It is an object of this invention to provide a handheld device and a method for determining the location of a physical object which is stored in one of a plurality of storage containers, which handheld device and method do not have at least some of the disadvantages of the prior art. In particular, it is an object of the present invention to provide a handheld device and a method for determining the location of a physical object which is stored in one of a plurality of storage containers, which handheld device and method provide for an accurate and fast access to the physical objects stored in the storage containers.

According to the present invention, these objects are achieved through the features of the independent claims. In addition, further advantageous embodiments follow from the dependent claims and the description.

According to the present invention, the above-mentioned objects are particularly achieved in that a handheld device for determining the location of a physical object which is stored in one of a plurality of storage containers comprises a reader system configured to read on the storage container in which the physical object is placed a visual code which is provided on each of the containers and comprises a unique container identifier. The handheld device further comprises a data entry system configured to capture in the handheld device object data identifying the physical object and to store the object data in a data store linked to the container identifier of the storage container in which the physical object is placed. The data entry system is further configured to capture in the handheld device query data which defines the physical object. The handheld device further comprises a query module configured to determine the container identifier of the storage container containing the physical object by comparing the query data to the object data in the data store, and to indicate the location of the physical object by showing on a display of the handheld device the container identifier of the storage container containing the physical object. When placing the physical objects into the storage container, data linking the physical object and the storage container is linked together and stored. When searching the physical object, it is sufficient to search the data linking the physical object with the storage container. The physical object can therefore be accessed accurately and in short time.

In an embodiment, the data entry system is further configured to store with the container identifier in the data store a container type which is included in the visual code and defines a visual representation of the storage container; and the query module is further configured to indicate the location of the physical object by showing on the display the visual representation of the storage container containing the physical object. Through the visual representation of the storage container, which may include in particular a picture, a representation of the dimensions or the color of the storage container, the user is provided with additional information which facilitates and supports the user in locating the storage container holding the needed physical object and, thus, makes it easier to locate and access selectively physical objects stored in the storage containers.

In another embodiment, the data entry system comprises a camera for recording a picture of the physical object; the data entry system is further configured to capture the query data by showing on the display pictures of physical objects and receiving a user selection of one of the pictures; and the query module is further configured to determine the container identifier of the storage container containing the physical object by comparing the picture selected by the user to pictures stored in the data store. When searching for a physical object, the user is further supported by displaying the pictures of available physical objects, such that locating and accessing the physical objects is further improved, simplified, and expedited.

In an embodiment, the data entry system is further configured to capture location information which defines the location of the storage container in which the physical object is placed; and the query module is further configured to indicate the location of the physical object by showing on the display the location information of the storage container containing the physical object. Location information may be captured when the physical object is placed in the storage container or when the storage container is placed in an attic or a cellar, for example, using a GPS (GPS: Global Positioning System) included in the handheld device. Thus, when accessing a desired physical object, the user is further assisted in locating and accessing the respective storage container containing the physical object.

In another embodiment, the reader system comprises a camera for recording a picture of the visual code and a code scanner configured to detect the container identifier in the picture of the visual code. Visual codes placed on the storage containers may therefore be detected easily, such that the storage containers can be identified easily.

In an embodiment, the reader system is configured to read a QR code, a bar code, and/or an alphanumeric code. A QR code (QR: Quick Response), a bar code, and/or an alphanumeric code provide for robust detection of the container identifier, also with a sufficiently high data storage capacity for the container identifier, which may have a length of, for example, 128-bit.

In addition to the handheld device for determining the location of a physical object which is stored in one of a plurality of storage containers, the invention further relates to a method of determining the location of a physical object which is stored in one of a plurality of storage containers. The method comprises: reading with a handheld device on the storage container in which the physical object is placed a visual code which is provided on each of the containers and comprises a unique container identifier. The method further comprises: capturing in the handheld device object data identifying the physical object, storing by the handheld device in a data store the object data linked to the container identifier of the storage container in which the physical object is placed, and capturing in the handheld device query data which defines the physical object. The method further comprises: determining by the handheld the container identifier of the storage container containing the physical object by comparing the query data to the object data in the data store, and indicating the location of the physical object by showing on a display of the handheld device the container identifier of the storage container containing the physical object.

In a variant the visual code includes a container type defining a visual representation of a storage container, the handheld device stores in the data store the container type with the container identifier, and indicating the location of the physical object includes showing on the display the visual representation of the storage container containing the physical object.

In another variant, capturing the object data includes recording a picture of the physical object using a camera of the handheld device, capturing the query data includes showing on the display of the handheld device pictures of physical objects and receiving at the handheld device a user selection of one of the pictures, and determining the container identifier of the storage container containing the physical object includes comparing the picture selected by the user to pictures stored in the data store.

In a variant, the method further comprises capturing in the handheld device location information which defines the location of the storage container in which the physical object is placed; and indicating the location of the physical object includes showing on the display the location information of the storage container containing the physical object.

In another variant, the physical object is stored in one of a plurality of plastic storage containers; and the storage containers are provided with a QR code, a bar code, and/or an alphanumeric code.

In addition to a handheld device and a method for determining the location of a physical object which is stored in one of a plurality of storage containers, the present invention also relates to a computer program product comprising a computer readable medium having stored thereon computer program code which directs a processor of a handheld device to: read on a storage container in which at least one physical object is placed a visual code which is provided on the container and comprises a unique container identifier; to capture object data identifying the physical object; to store in a data store the object data linked to the container identifier of the storage container in which the physical object is placed; to capture query data which defines the physical object; to determine the container identifier of the storage container containing the physical object by comparing the query data to the object data in the data store; and to indicate the location of the physical object by showing on a display of the handheld device the container identifier of the storage container containing the physical object.

In a variant, further computer program code is included which directs the processor of the handheld device to store with the container identifier in the data store a container type which is included in the visual code and defines a visual representation of a storage container, and to indicate the location of the physical object by showing on the display the visual representation of the storage container containing the physical object.

In another variant, further computer program code is included which directs the processor of the handheld device to record with the object data a picture of the physical object using a camera of the handheld device, to capture the query data by showing on the display of the handheld device pictures of physical objects and receiving a user selection of one of the pictures, and to determine the container identifier of the storage container containing the physical object by comparing the picture selected by the user to pictures stored in the data store.

In a variant, further computer program code is included which directs the processor of the handheld device to capture location information which defines the location of the storage container in which the object is placed, and to indicate the location of the physical object by showing on the display the location information of the storage container containing the physical object.

BRIEF DESCRIPTION OF THE DRAWINGS

The present invention will be explained in more detail, by way of example, with reference to the drawings in which:

FIG. 1: shows a block diagram illustrating schematically a handheld device;

FIG. 2: shows a block diagram illustrating schematically a handheld device in the process of reading a visual code placed on a storage container;

FIG. 3 shows a block diagram illustrating schematically a handheld device in the process of capturing object data identifying a physical object;

FIG. 4 shows a block diagram illustrating schematically a physical object stored in a storage container and a handheld device having a container identifier linked with object data;

DETAILED DESCRIPTION OF THE PREFERRED EMBODIMENTS

Figure 5:
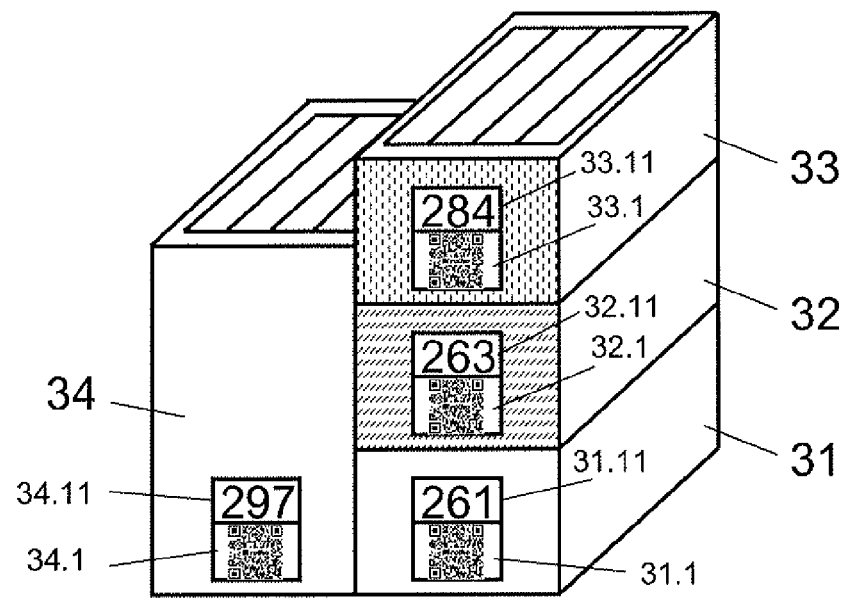
FIG. 5 shows a block diagram illustrating schematically a plurality of storage containers for storing physical objects.

FIG. 1 shows schematically a handheld device 1, for example an operational mobile communication terminal such as a mobile phone, comprising hardware components such as a touch screen, a keyboard, a display 1.0, a camera 1.9, one or more processors, a memory, a battery, etc. and comprising software components such as the Apple iOS operating system (developed by Apple Inc.), the Android operating system (developed by the Open Handset Alliance led by Google Inc.), or any other operating system, as well as programmed user applications, for example so called Apps, wherein one of the Apps, hereinafter referred to as the "myBox App", comprises programmed software modules configured to provide the functions described in the following paragraphs for determining the location of a physical object stored in one of a plurality of storage containers. As illustrated in FIG. 1, the handheld device 1 further comprises various functional modules or systems, including a reader system 1.1, a data entry system 1.2, a query module 1.6, and a data store 1.4. Depending on the embodiment, these functional modules are implemented by way of programmed software modules, comprising computer code stored on a computer-readable medium, by way of hardware components, or a combination of software and hardware.

As schematically shown in FIG. 2, the reader system 1.1 of the handheld device 1 comprises a camera 1.9 or is connected thereto. The reader system 1.1 is designed to optically capture pictures such as a visual code 31.1, 32.1, 33.1, 34.1 placed on a storage container 31, 32, 33, 34, e.g. printed on a label which is attached to the storage container 31, 32, 33, 34, printed directly on the storage container 31, 32, 33, 34, or embedded in the storage container 31, 32, 33, 34. The reader system 1.1 further includes a code scanner configured to detect a unique container identifier 31.2 which is included in the visual code 31.1, 32.1, 33.1. Preferably, the code scanner is configured to extract the unique container identifier 31.2 from the captured picture of the visual code 31.1, 32.1, 33.1, 34.1, e.g. by way of image processing modules. As schematically shown in FIG. 2, a local container identifier 31.11, 32.11, 33.11, 34.11 may be arranged next to the visual code 31.1, 32.1, 33.1, 34.1 such that in a local environment of a user, for example in a house, the visual codes 31.1, 32.1, 33.1, 34.1 can be easily identified by a user through the local container identifier 31.11, 32.11, 33.11, 34.11.

In order to determine the unique container identifier 31.2 of a visual code 31.1, 32.1, 33.1, 34.1 the handheld device 1 is configured to be placed in front of a storage container 31, 32, 33, 34, as illustrated schematically in FIG. 2. The handheld device 1 is configured such that a user may orientate the camera 1.9 of the reader system 1.1 towards the visual code 31.1, 32.1, 33.1, 34.1 applied on the container 31, 32, 33, 34. In an embodiment, the reader system 1.1 is configured to display the image data currently viewed by the camera of the reader system 1.1 via the user interface of the handheld device 1, for example on the display 1.0 of the handheld device 1. Accordingly, the handheld device 1 is configured such that a user may verify if the camera 1.9 is correctly oriented and that a visual code 31.1, 32.1, 33.1 placed on the container 31, 32, 33, 34 is correctly captured. The handheld device 1 is configured such that the user may direct the reader system 1.1 to read the visual code 31.1, 32.1, 33.1, 34.1 and to determine the unique identifier 31.2 contained therein, for example by using the user interface such as the touch screen of the handheld device 1, when the camera 1.9 is positioned and oriented to capture the visual code 31.1, 32.1, 33.1, 34.1 of the container 31, 32, 33, 34. The myBox App is configured to receive the determined unique container identifier 31.2 through the reader system 1.1.

Depending on the embodiment, the visual code 31.1, 32.1, 33.1, 34.1 comprises a one-dimensional or two-dimensional code, such as the QR code (QR: Quick Response), the Aztec Code, the High Capacity Color Barcode, a bar code, an alphanumeric code, or any other optical machine-readable representation of data. The visual code 31.1, 32.1, 33.1, 34.1 has a capacity of up to several thousand characters, for example.

As schematically shown in FIG. 3, the data entry system 1.2 of the handheld device 1 is configured to capture object data 21.2 identifying a physical object 21, 22, 23. The data entry system 1.2 comprises a user interface, with data entry elements such as a keyboard and display 1.0 or a touch screen of the handheld device 1. Moreover, the data entry system 1.2 may also comprise a camera, which may be the same camera as the camera 1.9 of the reader system 1.1. In a further embodiment, the data entry system 1.2 comprises a information retrieval system configured to capture an object code, e.g. a bar code, a QR code or another code arranged on physical object 21, 22, 23, and to retrieve from a remote information system object data 21.2 assigned to the object code; for example, the object data 21.2 includes medical information linked to an object code on a medication container, author and/or content information linked to an ISBN code (International Standard Book Number) arranged on a book, composer, musician and song information linked to a code arranged on a Compact Disc, etc. In an additional embodiment, the data entry system 1.2 is configured to receive and include in the object data 21.2 a web link, e.g. a URL (Uniform Resource Locator), which provides a link to a web site containing further object data relevant for the physical object 21, 22, 23.

As schematically shown in FIG. 4, the handheld device 1, specifically the data entry system 1.2, is further configured to store the object data 21.2 in a data store 1.4, wherein the object data 21.2 is linked to the container identifier 31.2 of the storage container 31, 32, 33, 34. For example, the data store 1.4 includes a computer-readable medium arranged in the handheld device 1 and/or on a remote computer connected to the handheld device 1, e.g. via a wireless local area network (WLAN) or a mobile radio network such as GSM (Global System for Mobile Communication) or UMTS (Universal Mobile Telecommunications System), and is controlled by a programmed software module of the myBox App. In a variant, the data store 1.4 includes a data store arranged on an Internet server, wherein a programmed software module of the myBox App is configured to access the data store on the server through the IP protocol (IP: Internet Protocol). For example, the data store on the Internet server includes a Web-Server accessible through a Web protocol such as HTTP (Hypertext Transfer Protocol) or HTTPS (Hypertext Transfer Protocol Secure). In an embodiment, data aspects of the physical objects are updated online, such as, for example, value of collectibles or jewelry, new releases of favored artist or updated clinical data on medications. Moreover, in a variant, visual data of physical objects is linked between the handheld device 1 and web based search engines. An additional advantage includes enabling management of complicated storage of: documents, medicine, spare parts etc.

Hence, when physical objects 21, 22, 23 are stored in storage containers 31, 32, 33, 34, a user may select a storage container 31 and determine its container identifier 31.2 as described above in connection with FIG. 2 from the visual code 31.1 of the storage container 31. The user may then select a physical object 21, for example a shoe, and determine its object data 21.2, as described above in connection with FIG. 3. For example, the data entry system 1.2 controlled by the myBox App is configured (programmed) such that, as soon as the container identifier 31.2 and its object data 21.2 are determined, a user is requested to confirm that the physical object 21 corresponding to the object data 21.2 has been stored in the respective storage container 31 with the associated visual code 31.1 corresponding to the container identifier 31.2. For example, the data entry system 1.2 is configured such that a picture of the storage container 31 and a picture of the physical object 21 are displayed on the display of the handheld device 1. In an embodiment, the data entry system 1.2 is further configured to animate the displayed pictures of the storage container 31 and the physical object 21, such that a user is informed intuitively about the next action to be taken. The data entry system 1.2 is configured to store the object data in the data store 1.4 linked to the respective container identifier 31.2.

A user may repeat several times the procedure as described above in connection with FIGS. 2, 3, and 4, until all physical objects 21, 22, 23 are stored as desired in storage containers 31, 32, 33, 34. Accordingly, the data store 1.4 has stored therein corresponding object data 21.2 linked to container identifiers 31.2. The user may then place the storage containers 31, 32, 33, 34 having stored therein the physical objects 21, 22, 23 in any desired location, for example in an attic or cellar of a house.

For example, the data entry system 1.2 controlled by the myBox App is configured to store in the data store 1.4, linked with the object data 21.2, descriptive data of the physical object 21, 22, 23, for example the type of the physical object 21, 22, 23, e.g. "shoe", "pan", or "lamp", the dimensions or weight of the physical object 21, 22, 23, and/or a visual representation such as a picture of the physical object 21, 22, 23. The data entry system 1.2 is further configured to store in the data store 1.4, linked with the container identifier 31.2, descriptive data of the storage container 31, 32, 33, 34, for example a visual representation such as a picture of the visual code 31.1, 32.1, 33.1, 34.1, a visual representation such as a picture of a local container identifier 31.11, 32.11, 33.11, 34.11, the type of the storage container 31, 32, 33, 34, wherein the container type may define the dimensions, the color, or any other feature of the container 31, 32, 33, 34, or a visual representation such as a picture of the storage container 31, 32, 33, 34.

Whereas the unique container identifier 31.2 is designed as an identifier which is globally or regionally unique, for example a 128-bit number which is uniquely assigned in the world or in a geographical region by an assigning authority, the local container identifier 31.11, 32.11, 33.11, 34.11 is designed as an identifier which is only locally unique, for example a 3-digit number which is uniquely assigned by a user to be valid within a house or a building. Hence, the container identifier 31.2 is designed to identify and distinguish the storage containers 31, 32, 33, 34 from each other throughout the world or at least a defined geographical region, whereas the local container identifier 31.11, 32.11, 33.11, 34.11 is designed to identify and distinguish the storage containers 31, 32, 33, 34 inside a house or a building. Whereas for distinguishing the container identifiers 31.2, for example a 128-bit number, an electronic device with a processing unit, such as handheld device 1, is used, distinguishing the local container identifier can be performed easily without additional equipment by a user by reading the 3-digit numbers.

FIG. 5 shows schematically a plurality of storage containers 31, 32, 33, 34, which are, for example, stored in an attic or cellar of a house. The storage containers 31, 32, 33, 34 contain physical objects 21, 22, 23, which have been stored according to the procedures described above. A user may now have the need to access a physical object 21, for example a shoe.

The data entry system 1.2 is further configured such that in case a user wants to locate, access and use a physical object 21, 22, 23 stored in one of the storage containers 31, 32, 33, 34, query data defining one or more physical objects 21, 22, 23 is received from the user. In an embodiment, stored descriptive data of physical objects 21, 22, 23 is retrieved and presented to the user and one or more physical objects 21, 22, 23 are defined by the user making a selection from the descriptive data. For example, presented to the user are visual representations such as pictures of the physical objects 21, 22, 23 stored in the storage containers 31, 32, 33, 34. The data entry system 1.2 is configured such that a user may scroll through the visual representations and select the visual representation(s) of the desired physical object(s) 21, 22, 23, for example a shoe, as illustrated schematically in FIG. 6*a*. Specifically, data entry system 1.2 is configured such that the object data 21.2, which is linked to the selected visual representation of the physical object 21, 22, 23, is retrieved from the data store 1.4 and then used as query data 21.1 in the following step.

Figure 6:
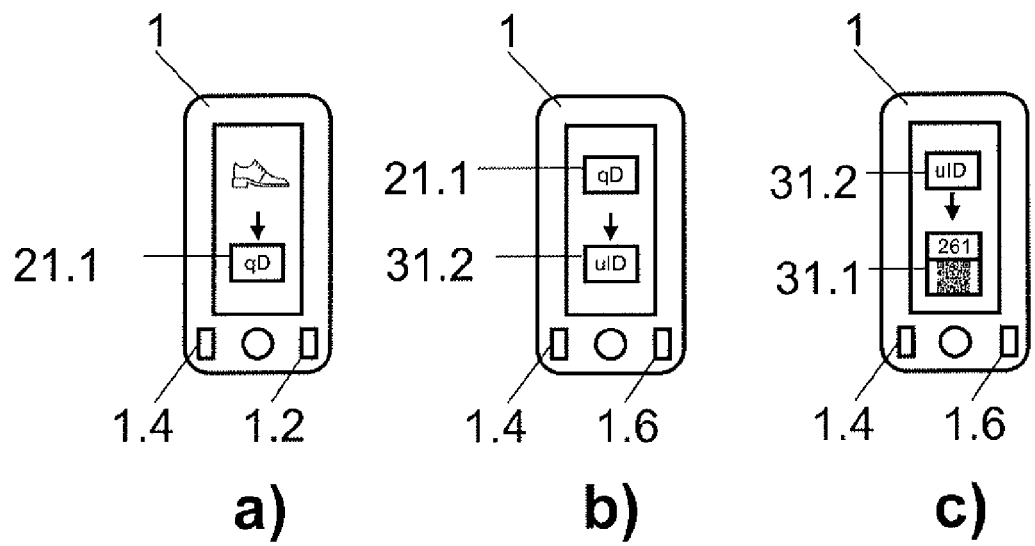
FIG. 6 shows a block diagram illustrating schematically a handheld device in the process of capturing query data and determining a container identifier.

As shown schematically in FIG. 6*b*, the handheld device 1 includes a query module 1.6, preferably, a programmed software module of the myBox App. The query module 1.6 is configured to determine one or more physical objects 21, 22, 23 based on the query data 21.1 entered or defined from the user. Specifically, the query module 1.6 uses the query data 21.1 to determine the unique container identifier 31.2 of the storage container 31, 32, 33, 34 which stores the desired physical object 21, 22, 23.

As shown schematically in FIG. 6*c*, the query module 1.6 is configured to use the unique container identifier 31.2 to determine a visual representation, e.g. a picture of the visual code 31.1, 32.1, 33.1, 34.1, and/or a picture of the local container identifier 31.11, 32.11, 33.11, 34.11, of the storage container 31, 32, 33, 34 which contains the desired physical object 21, 22, 23. For example, the myBox App may be configured that a visual representation like a picture of the local container identifier 31.11, 32.11, 33.11, 34.11 is displayed on the display of the handheld device 1, such that the user may select and open the storage container 31, 32, 33, 34 which stores the desired physical object 21, 22, 23. For example, the query module 1.6 is configured to display beside the picture of the local container identifier 31.11, 32.11, 33.11, 34.11 a picture of the container 31, 32, 33, 34, such that the user is further assisted in selecting the storage container 31, 32, 33, 34 containing the desired physical object 21, 22, 23.

Figure 7:
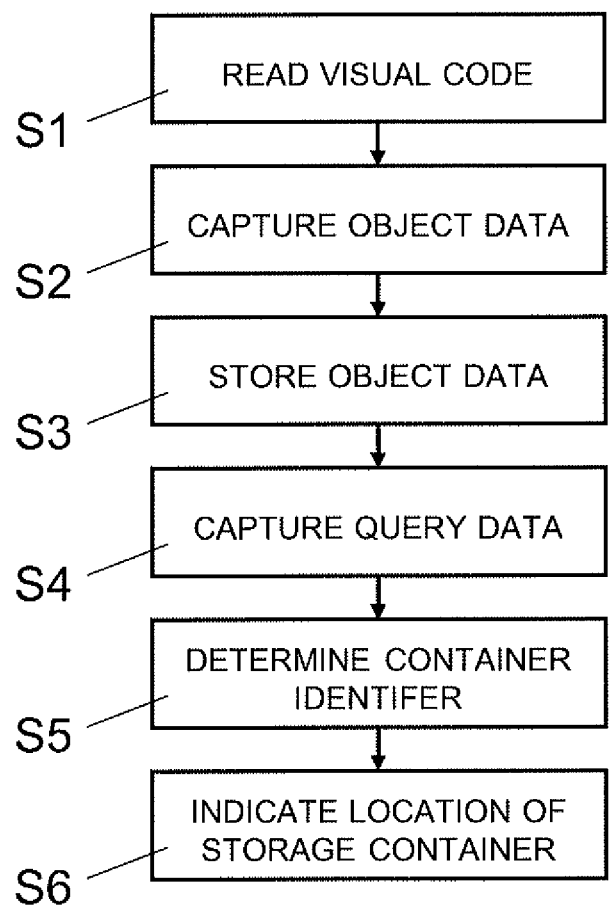
FIG. 7 shows an exemplary sequence of steps for determining the location of a physical object stored in a storage container.

In the following paragraphs, described with reference to FIG. 7 are possible sequences of steps performed for determining the location of a physical object 21, 22, 23 which is stored in one of a plurality of storage containers 31, 32, 33, 34. One skilled in the art will understand, that the described sequence is also applicable to locating more than one physical object 21, 22, 23, e.g. a group of physical objects 21, 22, 23 having a certain common type or sharing other common criteria. Moreover, several authorized users, e.g. family members, can access the data store 1.4, if the data of the data store 1.4 is stored in a database configured for remote access via a mobile radio network or WLAN.

In step S1, the reader system 1.1 of the handheld device 1 reads a visual code 31.1, 32.1, 33.1, 34.1 which is provided on each of the storage containers 31, 32, 33, 34 and comprises a unique container identifier 31.2.

In step S2, the data entry system 1.2 captures in the handheld device 1 object data 21.2 which identifies the physical object.

In step S3, the data entry system 1.2 of the handheld device 1 stores the object data 21.2 in a data store 1.4, linking the object data 21.2 to the container identifier 31.2 of the storage container 31, 32, 33, 34 in which the physical object is placed.

In step S4, the data entry system 1.2 captures in the handheld device 1 query data 21.1 which defines the physical object 21, 22, 23.

In step S5, the query module 1.6 of the handheld device 1 determines the container identifier 31.2 of the storage container 31, 32, 33, 34 containing the physical object 21, 22, 23 by comparing the query data 21.1 to the object data 21.2 in the data store 1.4.

In step S6, the query module 1.6 indicates the location of the physical object 21, 22, 23 by showing on a display of the handheld device 1 the container identifier 31.2 of the storage container 31, 32, 33, 34 containing the physical object 21, 22, 23, e.g. together with a visual representation and/or other metadata associated with that storage container 31, 32, 33, 34.

It should be noted that, in the description, the computer program code has been associated with specific functional modules and the sequence of the steps has been presented in a specific order, one skilled in the art will understand, however, that the computer program code may be structured differently and that the order of at least some of the steps could be altered, without deviating from the scope of the invention.

The invention claimed is:

1. A handheld device for determining a location of a physical object which is stored in one of a plurality of storage containers, the device comprising:
    a reader system configured to read, on the storage container in which the physical object is placed, a visual code which is provided on each of the containers, a user-readable unique container identifier also being provided on each of the containers;
    wherein the reader system is configured to extract the user-readable unique container identifier from the visual code;
    a data entry system configured to capture in the handheld device object data identifying the physical object and to store the object data in a data store linked to the user-readable container identifier of the storage container in which the physical object is placed;
    the data entry system being further configured to capture in the handheld device query data which defines the physical object; and
    a query module configured to determine the user-readable container identifier of the storage container containing the physical object~ by comparing the query data to the object data in the data store, and to indicate the location of the physical object by showing on a display of the handheld device the user-readable container identifier of the storage container containing the physical object.

2. The handheld device of claim 1, wherein the data entry system is further configured to store with the user-readable container identifier in the data store a container type which is included in the visual code and defines a visual representation of the storage container; and the query module is further configured to indicate the location of the physical object by showing on the display the visual representation of the storage container containing the physical object.

3. The handheld device of claim 1, wherein the data entry system comprises a camera for recording a picture of the physical object; the data entry system is further configured to capture the query data by showing on the display pictures of physical objects and receiving a user selection of one of the pictures; and the query module is further configured to determine the user-readable container identifier of the storage container containing the physical object by comparing the picture selected by the user to pictures stored in the data store.

4. The handheld device of claim 1, wherein the data entry system is further configured to capture location information which defines the location of the storage container in which the physical object is placed; and the query module is further configured to indicate the location of the physical object by showing on the display the location information of the storage container containing the physical object.

5. The handheld device of claim 1, wherein the reader system comprises a camera for recording a picture of the visual code and a code scanner configured to detect the user-readable container identifier in the picture of the visual code.

6. The handheld device of claim 1, wherein the reader system is configured to read at least one of: a QR code, a bar code, and an alphanumeric code.

7. A method of determining a location of a physical object which is stored in one of a plurality of storage containers, the method comprising:
    Reading, with a handheld device on the storage container in which the physical object is placed, a visual code which is provided on each of the containers, a user-readable unique container identifier also being provided on each of the containers;
    configuring to extract the user-readable unique container identifier from the visual code;
    capturing in the handheld device object data identifying the physical object;
    storing by the handheld device in a data store the object data linked to the user-readable container identifier of the storage container in which the physical object is placed;
    capturing in the handheld device query data which defines the physical object;
    determining by the handheld device the user-readable container identifier of the storage container containing the physical object by comparing the query data to the object data in the data store; and
    indicating the location of the physical object by showing on a display of the handheld device the user-readable container identifier of the storage container containing the physical object.

8. The method of claim 7, wherein the visual code includes a container type defining a visual representation of a storage container, the handheld device stores in the data store the container type with the user-readable container identifier, and indicating the location of the physical object includes showing on the display the visual representation of the storage container containing the physical object.

9. The method of claim 7, wherein capturing the object data includes recording a picture of the physical object using a camera of the handheld device, capturing the query data includes showing on the display of the handheld device pictures of physical objects and receiving at the handheld device a user selection of one of the pictures, and determining the user-readable container identifier of the storage container containing the physical object includes comparing the picture selected by the user to pictures stored in the data store.

10. The method of claim 7, wherein the method further comprises capturing in the handheld device location information which defines the location of the storage container in which the physical object is placed; and indicating the location of the physical object includes showing on the display the location information of the storage container containing the physical object.

11. The method of claim 7, wherein the physical object is stored in one of a plurality of plastic storage containers; and the storage containers are provided with at least one of: a QR code, a bar code, and an alphanumeric code.

12. A non-transitory computer program product comprising a computer readable medium having stored thereon computer program code which directs a processor of a handheld device to:

read, on a storage container in which at least one physical object is placed, a visual code which is provided on the container, a user-readable unique container identifier also being provided on each of the containers;
configure to extract the user-readable unique container identifier from the visual code;
capture object data identifying the physical object;
store in a data store the object data linked to the user-readable container identifier of the storage container in which the physical object is placed;
capture query data which defines the physical object;
determine the user-readable container identifier of the storage container containing the physical object by comparing the query data to the object data in the data store; and
indicate a location of the physical object by showing on a display of the handheld device the user-readable container identifier of the storage container containing the physical object.

13. The non-transitory computer program product of claim 12, comprising further computer program code which directs the processor of the handheld device to store with the user-readable container identifier in the data store a container type which is included in the visual code and defines a visual representation of a storage container, and to indicate the location of the physical object by showing on the display the visual representation of the storage container containing the physical object.

14. The non-transitory computer program product of claim 12, comprising further computer program code which directs the processor of the handheld device to record with the object data a picture of the physical object using a camera of the handheld device, and to capture the query data by showing on the display of the handheld device pictures of physical objects and receiving a user selection of one of the pictures, and to determine the user-readable container identifier of the storage container containing the physical object by comparing the picture selected by the user to pictures stored in the data store.

15. The non-transitory computer program product of claim 12, comprising further computer program code which directs the processor of the handheld device to capture location information which defines the location of the storage container in which the object is placed, and to indicate the location of the physical object by showing on the display the location information of the storage container containing the physical object.

* * * * *